Figure 3:
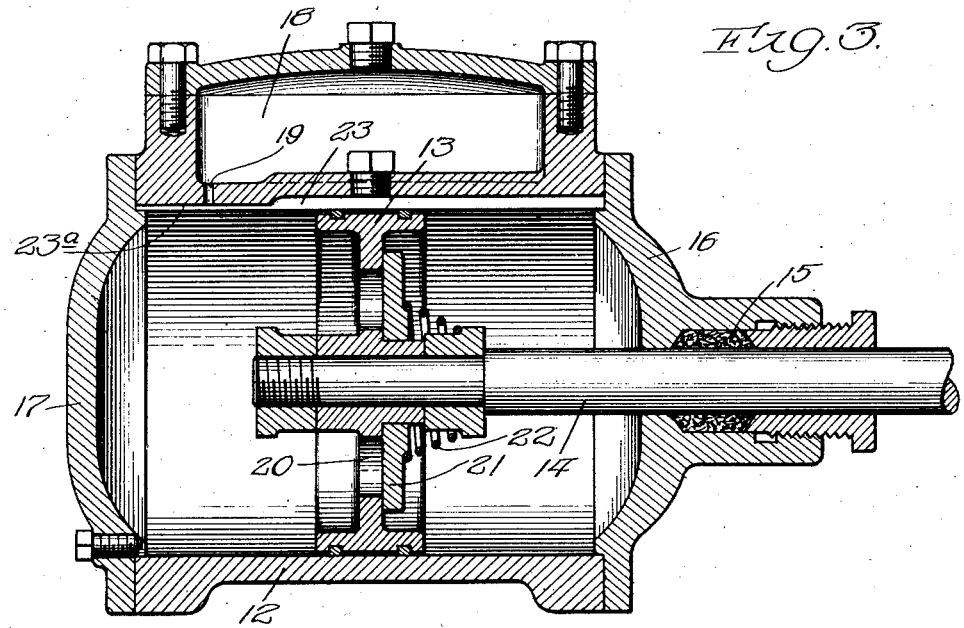

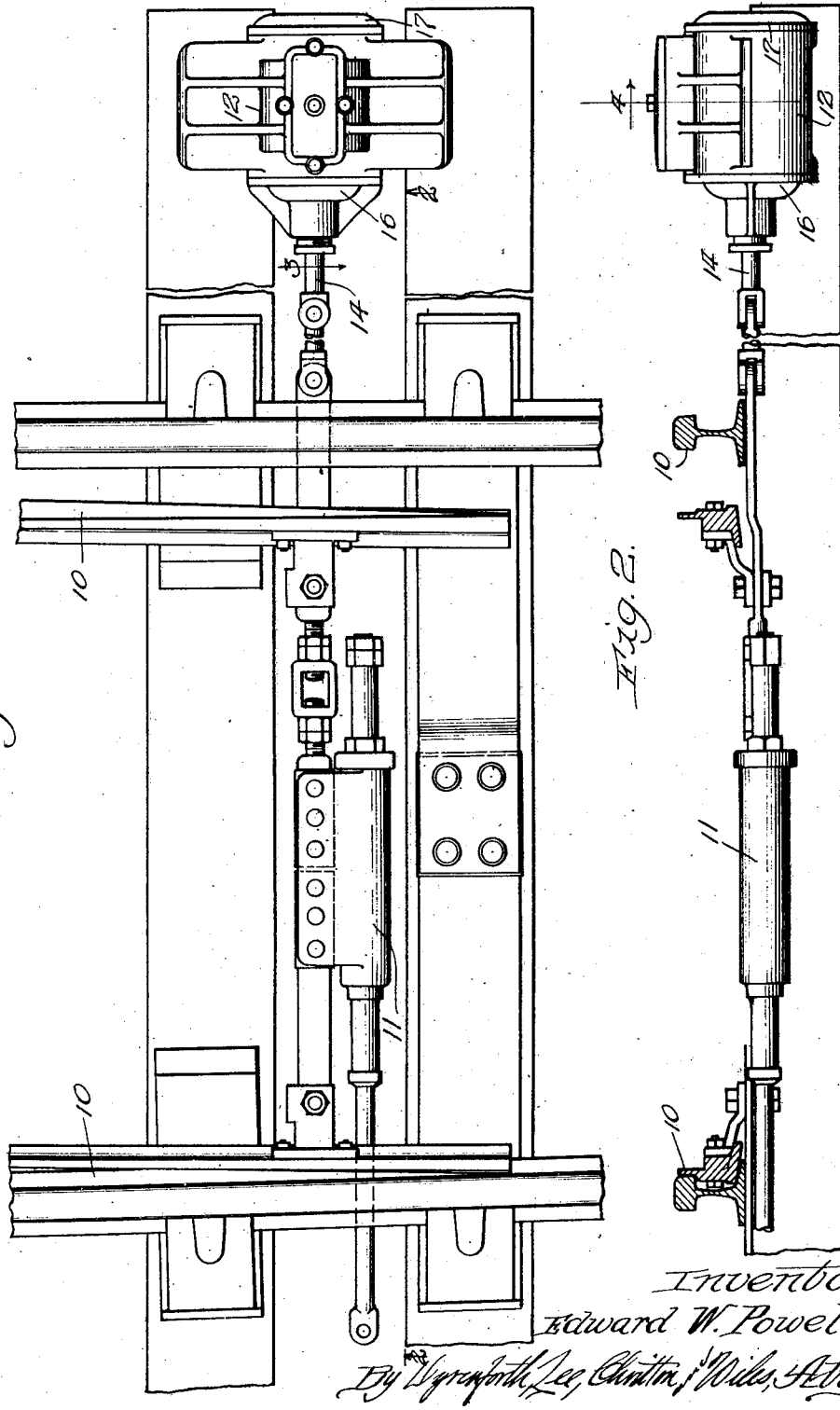

Oct. 30, 1928.

E. W. POWELL

SHOCK ABSORBER

Filed May 8, 1926

1,689,841

2 Sheets-Sheet 2

Inventor:
Edward W. Powell,

Patented Oct. 30, 1928.

1,689,841

UNITED STATES PATENT OFFICE.

EDWARD W. POWELL, OF CHICAGO, ILLINOIS, ASSIGNOR TO PETTIBONE MULLIKEN COMPANY, OF CHICAGO, ILLINOIS, A CORPORATION OF NEW YORK.

SHOCK ABSORBER.

Application filed May 8, 1926. Serial No. 107,671.

This invention relates to improvements in shock absorbers, and is here shown as embodied in a device especially adapted for use in connection with a spring switch. It is to be understood, however, that the shock absorber is adapted for many other uses and the showing here of the same in connection with a spring switch is not to be construed as a limitation upon its other uses and purposes.

Among the features of my invention is the provision of a shock absorber that permits a faster movement at the end of the operative stroke than at the beginning. In other words, when the shock absorber is compressed to the full extent of its return stroke, its outward movement at the start of the operative stroke is relatively slow, and, after a certain distance moves somewhat faster. This construction is particularly desirable and useful in connection with the adaptation of a shock absorber for a spring switch. In such switches, a considerable amount of wear and tear can be eliminated if the return movement of the switch points is relatively slow at the start. For example, in the passage of a train, it is desirable that the switch points do not spring back immediately after the passage of each pair of wheels. If this is done, it will be seen that there will be a great amount of wear on the parts, as the switch points will be slapped back and forth by each pair of wheels. By the use of my improved shock absorber, the switch points will remain substantially in the position they are left after the passage of the first pair of wheels on a train until the complete train has passed, and then will return to their original position to accommodate a train moving in the opposite direction. The feature just described will appear more clearly as I describe the invention shown in the drawings in detail.

My improved shock absorber is simple in construction and operation, durable, and not easily put out of order or disabled.

Other features and advantages of my invention will appear more fully as I proceed with my specification.

Figure 4:
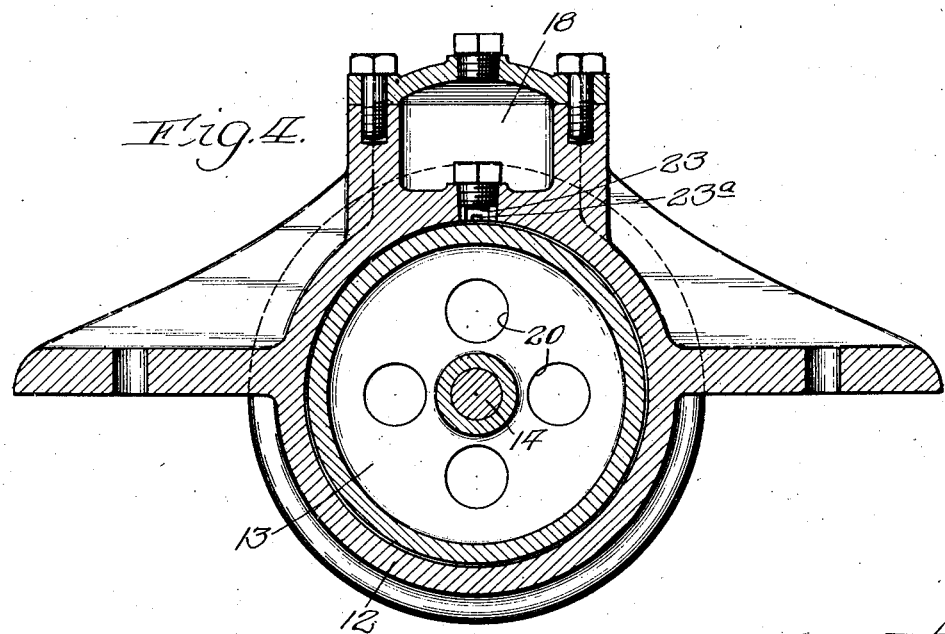

In that form of device embodying the features of my invention shown in the accompanying drawings, Fig. 1 is a plan view of my improved shock absorber showing the same applied to a spring railroad switch, Fig. 2 is a view taken as indicated by the line 2 of Fig. 1, Fig. 3 is a vertical sectional view through the cylinder, and Fig. 4 is a view taken as indicated by the line 4 of Fig. 2 on an enlarged scale.

As shown in the drawings, 10, 10 indicates the switch points of a spring switch. These points are yieldingly held in the position shown in Fig. 1, by a spring (not shown) of the usual type lying within the cylinder 11. The particular construction of the spring mechanism yieldingly holding the switch points in the position shown form no part of the present invention.

The spring mechanism referred to permits the switch points 10, 10, to be moved to the right (as viewed in the drawings) by the wheels of a car moving downwardly (as viewed in the drawings) on the main track, to permit such car to pass. Upon the passage of the car, the spring mechanism referred to operates to return the switch points to the position shown in the drawings so that a car moving in the opposite direction will normally leave the main track and take the switch to the right.

It will be seen that the ordinary spring mechanism of the spring switch referred to always tends to move the switch points to the left (as viewed in the drawings); and that whenever they are moved to the right by the car wheels against the pressure of the spring, such spring, as soon as the points are released by the car wheels, will operate to throw the switch points back. It will be seen that, without any shock absorber, the spring mechanism would throw the switch points back very quickly and with great force and subject the parts to a considerable shock, which would result in unnecessary damage or wear and tear. My improved shock absorber is here shown as connected to such a switch in order to absorb the shock, which would otherwise occur when the spring mechanism throws the switch points back after the passage of a car.

It will be seen that the movement of the switch points to the right by the passage of car wheels must be free and unobstructed, and that such movement does not subject the parts to any unreasonable shock. Consequently, my shock absorber is so arranged as to permit such movement freely. Hereafter, therefore, in the specification and claims I shall refer to such movement of my shock absorber as "return" movement. The stroke of my shock absorber, which operates to absorb the shock, that is, the stroke made by it in th movement of the switch points from right to left (as viewed in Fig. 1), I shall speak of as the "operative" stroke. That is, the movement of the piston of the shock absorber from left to right (as viewed in Fig. 3) is the operative stroke, and the other is the return stroke.

The details of the shock absorber itself are best shown in Figs. 3 and 4. As here shown, it will be seen that the shock absorber comprises in general a cylinder 12, having therein a piston 13 fastened on the end of the piston rod 14, which is connected by suitable connections as shown in Figs. 1 and 2, to the switch points. 15 indicates any suitable packing around the piston rod 14, where it passes through the cylinder head 16. 17 indicates the opposite cylinder head.

The cylinder 12 is normally filled with oil; and arranged above it is a suitable oil reservoir 18 having a small hole 19 in the bottom, through which oil is free to pass from the reservoir into the cylinder in order to keep the cylinder filled at all times.

The piston 13 is provided with four suitable ports closed by the valve 21, yieldingly held in closed position by the spring 22 as shown. It will be seen that the spring 22 permits the valve 21 to open to pass oil through the ports 20 from left to right (as viewed in Fig. 3). The spring 22 is sufficiently weak so that the piston 13 is substantially free to move from right to left (as viewed in Fig. 3) during its return stroke. The oil, during such movement, flows through the ports 20.

The upper surface of the cylinder wall is provided with a groove or by-pass 23, as shown. The left hand (as viewed in Fig. 3) end of this by-pass groove as indicated by 23ª is somewhat smaller than the major portion thereof. It will be seen that oil is permitted to escape around the piston 13 through this by-pass groove 23 during the operative stroke of the piston. The size of the groove or by-pass accordingly will regulate the rate of escape of oil and, consequently, the speed of the piston during its operative stroke. It will be seen that when the piston 13 is at the beginning of its operative stroke opposite the small groove 23ª, the escape of oil will be slow, and consequently, the movement of the piston at the beginning of its operative stroke will be relatively slow. When, however, the piston has moved sufficiently to come opposite the larger groove 23, the escape of oil will be faster, and, consequently, the movement of the piston faster. It will be seen, therefore, that at the beginning of the operative stroke, the piston will move relatively slowly.

In the movement of the shock absorber upon a spring switch as shown, the first car wheels will move the switch points over so that the piston 13 will be moved up to the beginning of its operative stroke. Therefore, as long as a train is moving over the switch, the car wheels will pass over the switch points in such rapid succession that the piston will at all times remain very near the beginning of its operative stroke. Accordingly, its operative movement after each pair of car wheels will be relatively slow and short; and, consequently, there will be very little slapping of the switch points as the train passes. After the last car wheels have left the switch, however, the switch points will go back to their original position and the shock absorber will absorb all shock.

In general, it may be said that the shock absorber substantially "locks" the switch points in their abnormal position when moved there by a passing train and substantially holds the same there after the passage of each pair of wheels a sufficient length of time, until the next pair of wheels on the same train reaches the switch points, thereby preventing slapping of the switch points while a train is passing. Such "locking," however, is not long enough to prevent the switch points from going back to their normal position after the entire train passes, so that they will be ready for a train coming in an opposite direction. The shock absorber besides accomplishing such "locking," also absorbs all shock as the switch points move from their abnormal to their normal position.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

It is to be noted that the communication between the oil reservoir and the cylinder enters the cylinder at the end corresponding to the beginning of the operative stroke of the piston. Because of this construction, there will be no undesirable tendency for movement of the piston to drive oil back into the reservoir.

It is to be noted also that the invention relates particularly to spring switches of the class described provided with a spring urging the switch points into their normal or rest position, that is the position shown in Fig. 1 of the drawings. As a train passes, the switch points are moved to the right (as viewed in Figs. 1 and 2) to their abnormal or compressed postion. As used in the claims, hereafter, it is to be understood then that by normal position I mean the position of the switch points shown in Figs. 1 and 2, and by compressed position the position the switch points take when they are pushed to the right (as viewed in Figs. 1 and 2) by the wheels of a passing train.

In the use of my invention, as has been stated above, the switch points are momentarily "locked" in their abnormal or compressed position and are held in this position a sufficient length of time to prevent slapping of the switch points as a train is passing. After the train has passed, however, the spring in the cylinder 11 moves the switch points back into their normal or rest position. This movement is very slow at first during the "locking", as above referred to, but after the switch points have moved a short distance, the movement becomes faster and freer. This feature is of special importance in view of the fact that frequently the switch points must move against the resistance of thick oil and dirt. It is necessary, also, that the switch points move to the end of their stroke so that one of the points will come firmly into contact with the main rail. In order to accomplish this, the spring must be able to exert its full force. Because of the construction above explained this is permitted, so that the switch points will move fully into their normal position.

What I claim as new, and desire to secure by Letters Patent, is;

1. In a spring switch of the class described; spring means urging the switch points into normal position; and means for momentarily "locking" the switch points substantially in their compressed position, said means comprising, a cylinder, a piston in the cylinder, a connection between said piston and the switch points, fluid in said cylinder, means permitting substantially free movement of said piston in the movement of the switch points from normal to compressed position, and a by-pass groove in the cylinder wall permitting escape of fluid by the piston during movement of the switch points from compressed to normal position, said by-pass groove being smaller at the end of the cylinder corresponding to the beginning of said last mentioned movement.

2. In a spring switch of the class described; spring means urging the switch points into normal position; and means for momentarily "locking" the switch points substantially in their compressed position, said means comprising, a cylinder, a piston in the cylinder, a connection between said piston and the switch points, fluid in said cylinder, means permitting substantially free movement of said piston in the movement of the switch points from normal to compressed position, and a by-pass permitting escape of fluid by the piston during movement of the switch points from compressed to normal position, the effective size of the by-pass being varied by movement of the piston.

3. In a spring switch of the class described; spring means urging the switch points into normal position; and means for momentarily "locking" the switch points substantially in their compressed position, said means comprising, a cylinder, a piston in the cylinder, a connection between said piston and the switch points, fluid in said cylinder, means permitting substantially free movement of said piston in the movement of the switch points from normal to compressed position, and a by-pass permitting escape of fluid by the piston during movement of the switch points from compressed to normal position, the effective size of the by-pass being increased by movement of the piston.

4. In a spring switch of the class described; spring means urging the switch points into normal position; and means for momentarily "locking" the switch points substantially in their compressed position, said means comprising, a cylinder, a piston in the cylinder, a connection between said piston and the switch points, fluid in said cylinder, means permitting substantially free movement of said piston in the movement of the switch points from normal to compressed position, and means for permitting escape of the fluid by the piston during movement of the switch points from compressed to normal position, said means permitting a less rapid escape of fluid at the beginning of said movement than at the end thereof, and means for keeping said cylinder filled with fluid.

5. In a spring switch of the class described; spring means urging the switch points into normal position; and means for retarding the movement of the switch points from compressed position to normal position, said means operating to permit relatively slower movement of said switch points at the beginning of their stroke than at the end thereof, and said means comprising, a cylinder, a piston in said cylinder, a connection between said piston and the switch points, fluid in said cylinder, means permitting substantially free movement of said piston in the movement of the switch points from normal to compressed position, and a by-pass permitting escape of fluid by the piston during movement of the switch points from their compressed position to their normal position, the effective size of the by-pass being varied by movement of the piston.

6. In a spring switch of the class described; spring means urging the switch points into normal position; and means for retarding the movement of the switch points from compressed position to normal position, said means operating to permit relatively slower movement of said switch points at the beginning of their stroke than at the end thereof, and said means comprising, a cylinder, a piston in said cylinder, a connection between said piston and the switch points, fluid in said cylinder, means permitting substantially free movement of said piston in the movement of the switch points from normal to compressed position, and a by-pass permitting escape of fluid by the piston during movement of the switch points from their compressed position to their normal position, the effective size of the by-pass being increased by movement of the piston.

7. In a spring switch of the class described; spring means urging the switch points into normal position; and means for momentarily "locking" the switch points substantially in their compressed position, said means comprising, a cylinder, a piston in the cylinder, a connection between said piston and the switch points, fluid in said cylinder, means permitting substantially free movement of said piston in the movement of the switch points from normal to compressed position, and means for permitting escape of the fluid by the piston during movement of the switch points from compressed to normal position, said means permitting a less rapid escape of fluid at the beginning of the said movement than at the end thereof, and means for keeping said cylinder filled with fluid, said means comprising a liquid reservoir above the cylinder and provided with a free communication leading to the cylinder.

8. In a spring switch of the class described; spring means urging the switch points into normal position; and means for momentarily "locking" the switch points substantially in their compressed position, said means comprising, a cylinder, a piston in the cylinder, a connection between said piston and the switch points, fluid in said cylinder, means permitting substantially free movement of said piston in the movement of the switch points from normal to compressed position, and means for permitting escape of the fluid by the piston during movement of the switch points from compressed to normal position, said means permitting a less rapid escape of fluid at the beginning of the said movement than at the end thereof, and means for keeping said cylinder filled with fluid, said means comprising a liquid reservoir above the cylinder and provided with a free communication leading to the cylinder and entering said cylinder at the end corresponding to the beginning of the operative stroke of the piston.

In testimony whereof I have hereunto set my hand this 28th day of April, 1926.

EDWARD W. POWELL.